United States Patent
Vinson et al.

(10) Patent No.: US 9,466,321 B1
(45) Date of Patent: Oct. 11, 2016

(54) ANGULAR POSITION TRACKING OF DATA ACCESSES TO MITIGATE RISK OF DATA LOSS

(71) Applicant: Western Digital Technologies, Inc., Irvine, CA (US)

(72) Inventors: Wayne H. Vinson, Longmont, CO (US); Marika Meertens, Boulder, CO (US); Edwin S. Olds, Fort Collins, CO (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/732,015

(22) Filed: Jun. 5, 2015

(51) Int. Cl.
 G11B 15/18 (2006.01)
 G11B 5/596 (2006.01)
 G11B 27/10 (2006.01)
 G11B 27/34 (2006.01)
 G11B 15/43 (2006.01)

(52) U.S. Cl.
 CPC ........... *G11B 5/59627* (2013.01); *G11B 15/43* (2013.01); *G11B 27/107* (2013.01); *G11B 27/34* (2013.01); *G11B 2220/90* (2013.01)

(58) Field of Classification Search
 None
 See application file for complete search history.

(56) References Cited

U.S. PATENT DOCUMENTS

| | | | |
|---|---|---|---|
| 4,366,512 A * | 12/1982 | Janak | G11B 5/012 360/48 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |

(Continued)

OTHER PUBLICATIONS

Robert M. Fallone, et al., U.S. Appl. No. 13/167,246, filed Jun. 23, 2011, 19 pages.

*Primary Examiner* — Tan X Dinh
(74) *Attorney, Agent, or Firm* — Brownstein Hyatt Farber Schreck, LLP

(57) ABSTRACT

Systems, apparatuses, and methods use angular position tracking in mitigating data loss risks stemming from adjacent track interference (ATI), wide area track erasure (WATER), and/or other issues. A storage device includes a rotational magnetic storage medium divided into a group of tracks and a controller communicably coupled to the rotational magnetic storage medium. The controller is configured to: determine, based on an angular position of a write operation within a group of tracks, whether the angular position of the write operation overlaps a previously written area in the group of tracks; in the event the angular position of the write operation overlaps the previously written area in the group of tracks, increment a counter; and in the event the counter exceeds a counter threshold, perform a data loss risk mitigation procedure.

26 Claims, 9 Drawing Sheets

(56) References Cited

U.S. PATENT DOCUMENTS

| | | |
|---|---|---|
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,429,984 B1 | 8/2002 | Alex |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |

(56) References Cited

U.S. PATENT DOCUMENTS

| | | |
|---|---|---|
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |

(56) References Cited

U.S. PATENT DOCUMENTS

| | | |
|---|---|---|
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 8,922,925 B1 * | 12/2014 | Coker ............... G11B 20/1217 360/48 |
| 2005/0168858 A1 * | 8/2005 | Lee ................. G11B 5/59633 360/31 |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0246703 A1 * | 9/2013 | Bandic ................ G11B 5/012 711/113 |
| 2013/0290668 A1 * | 10/2013 | Na ..................... G06F 12/08 711/203 |
| 2013/0318295 A1 * | 11/2013 | Kojima ........... G11B 20/10009 711/112 |
| 2013/0335847 A1 * | 12/2013 | Shiroishi ............... G11B 5/02 360/46 |
| 2014/0201424 A1 | 7/2014 | Chen et al. |
| 2015/0339236 A1 * | 11/2015 | Blount ............... G06F 12/0802 711/103 |

* cited by examiner

ANGULAR POSITION TRACKING OF DATA ACCESSES TO MITIGATE RISK OF DATA LOSS

TECHNICAL FIELD

This disclosure relates to data storage devices and, more particularly, to tracking position of data accesses to mitigate data loss risks stemming from issues such as adjacent track interference (ATI), wide area track erasure (WATER), and so on.

BACKGROUND

Many electronic devices, such as computing systems, generate and/or receive data that may be stored persistently. These electronic devices often utilize a data storage device, such as a hard disk drive ("HDD"), for data storage and retrieval. In many cases, a HDD can include a rotational disk or other media made from a magnetic material onto (and/or into) which data may be recorded as patterns of magnetic polarity. The rotational disk may be logically divided into nested rings referred to as "tracks," which may in turn be logically divided into multiple storage locations referred to as "sectors." One or more read/write heads of the HDD may write data to the rotational disk in response to a write instruction and/or retrieve data from the rotational disc in response to a read instruction.

Writing data to the rotational disk may sometimes affect unintended portions. For example, writing to a particular sector of a particular track may unintentionally alter adjacent sectors or tracks. Such alterations may be caused by ATI (unintentional writing and/or erasure of tracks to one or more sides of an intentionally written track caused by stray fields from a write head), WATER (unintentional writing and/or erasure of areas outside an intentionally written area caused by stray fields from a write head and the density and narrow width of tracks), or other such issues and may relate to magnetic flux used to write data to the particular sector leaking into outside areas. These kinds of issues may degrade magnetic polarity pattern integrity, making it more difficult to retrieve data and possibly resulting in data loss.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

DETAILED DESCRIPTION

Figure 1:
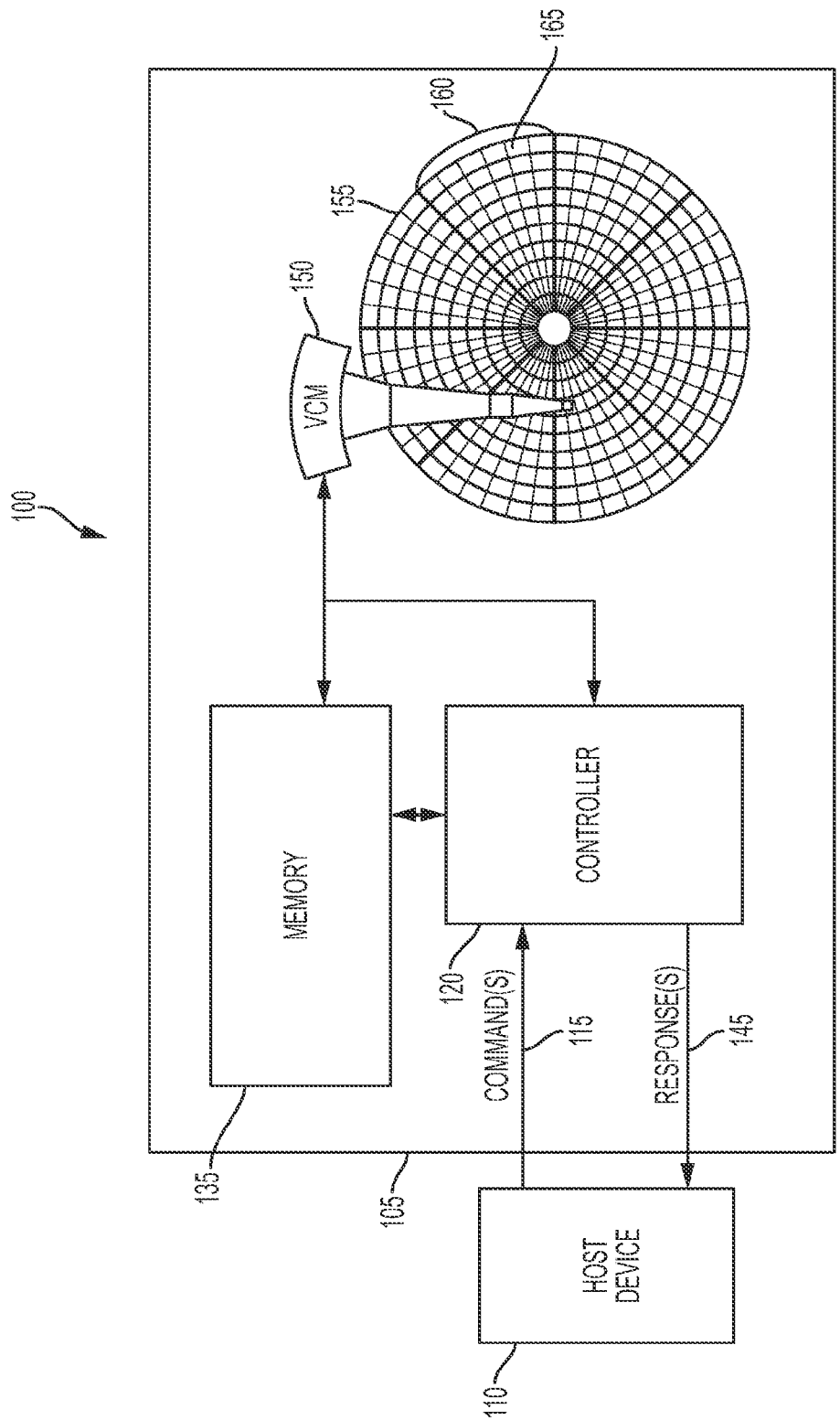
FIG. 1 depicts a simplified block diagram of a system with an example data storage device that uses angular position tracking in mitigating ATI, WATER, and/or other issues.

Issues such as ATI or WATER may be handled for a rotational magnetic storage medium by logically dividing the rotational magnetic storage medium into groups of one or more adjacent tracks. When a write is performed, counters for a group of tracks and/or other possibly affected groups of tracks may be incremented to reflect the fact that the write may have affected unintended areas (such as other nearby tracks or sectors). When one or more of the counters reaches a threshold, a procedure to mitigate data loss risks stemming from ATI, WATER, and/or other issues may be performed.

However, not all writes may affect unintended areas in ways that result in ATI, WATER, or other issues. For example, the angular position of a write may be far enough away from data recorded in other sectors or tracks of a group of tracks such that the data is not affected, such as a situation where data is stored in a track that is adjacent to a track where a write is performed but on the opposite side of the rotational magnetic storage medium. If the counters are updated whenever a write is performed to the group of tracks or to a group of tracks that may result in the group of tracks being affected without regard to angular position, mitigation procedures may be performed more often than are actually useful to mitigate ATI, WATER, and/or other issue. Mitigation procedures may include selectively rewriting the data deemed to be at risk. For example, whether the data is rewritten may be based on error correction status of the data when read.

Performance of mitigation procedures more often than is necessary may adversely impact response time of the data storage device. For example, if each write utilizes an average of revolution of the rotational magnetic storage medium, a mitigation procedure is triggered every 50 writes, and each mitigation procedure utilizes an average of 10 revolutions of the rotational magnetic storage medium, twenty percent of the write time of the data storage device would be devoted to mitigation procedures as opposed to performing writes (is understood that the sample numbers are purely examples for the sake of illustration and are not intended to be limiting). In this example, if the mitigation procedure would have been useful every 100 writes as opposed to every 50 writes for the reasons mentioned above, the data storage device would be spending twice the percentage of its write time performing mitigation procedures than is actually useful, significantly degrading performance of the data storage device.

However, tracking of angular position may enable improved determination of when to perform a mitigation procedure such that mitigation procedures may be performed less often. This may enable a data storage device to spend less time performing mitigation procedures and more time performing writes, improving the performance of the data storage device.

Some embodiments described herein relate to systems, apparatuses, and methods related to using position tracking in mitigating data loss risks stemming from ATI, WATER, and/or other issues. The position tracking can be based on an angular position of the data access operation on the rotating magnetic media. Whether or not an angular position of a write operation overlaps a previously written area in a group of tracks (which may be a group of a single track) of groups of tracks into which a rotational magnetic storage medium is divided may be determined based on the angular position of the write operation. In the event that the angular position of the write operation overlaps the previously written area, a counter may be incremented. If the counter exceeds a threshold, an ATI or WATER (or other issue) mitigation procedure may be performed. In this way, performance of the mitigation procedure more often than is useful may be avoided, improving performance of a data storage device including the rotational magnetic storage medium.

In some implementations, the angular position of the write operation may be compared to one or more pointers indicating an area of the group of tracks where write operations have been performed subsequent to the last time that the counter was incremented. For example, it may be determined whether the angular position is below a maximum previous write location pointer indicting a highest written servo wedge of a group of adjacent servo wedges. By way of another example, it may be determined whether the angular position is above a maximum previous write location pointer indicting a lowest written servo wedge of a group of adjacent servo wedges. In still another example, it may be determined whether the angular position is between such a maximum previous write location pointer and a minimum previous write location pointer.

In various implementations, the angular position of the write operation may be compared to a bit mask including data indicating areas of the group of tracks where writes have been performed subsequent to the last time that the counter was incremented. The data of the bit mask may indicate angular positions of previous writes in a group of adjacent servo wedges and may indicate all areas of the group of tracks where writes have been performed subsequent to the last time that the counter was incremented.

Although the above discusses comparing the angular position to a single pointer (or set of pointers) or bit mask for a group of tracks and incrementing a counter for that group of tracks, it is understood that these are example implementations. In various implementations, the angular position may be compared to multiple pointers and/or bit masks for multiple possibly affected groups of tracks and counters for the multiple possibly affected groups of tracks may be incremented accordingly. Besides pointers, counters and bit masks, other data structures such as arrays, linked lists, etc. may be used for tracking the positions of the data access operations.

Further, in some implementations the angular position may be compared to multiple pointers and/or bit masks that are each respectively associated with ATI, WATER, or other issues and counters respectively associated with ATI, WATER, or other issues may be incremented accordingly. In this way, mitigation procedures may be separately triggered based on the possibility of ATI, WATER, and/or other issues.

Although particular embodiments are discussed herein, it should be appreciated that the various embodiments, as well as functionality, operation, components, and capabilities thereof may be combined with other elements as necessary. Any physical, functional, or operational discussion of any element or feature is not intended to be limited solely to a particular embodiment to the exclusion of others.

FIG. 1 depicts a simplified block diagram of a system 100 with an example data storage device 105 that uses angular position tracking in mitigating data loss risks stemming from ATI, WATER, and/or other issues. As illustrated, the system 100 may include one or more data storage devices 105 that may be configured to communicate with one or more host devices 110. The host device 110 may be any electronic device such as a laptop computer, desktop computer, server, cellular phone, tablet computer, and so on. In some embodiments, the host device 110 can be implemented as a system of individual electronic devices, for example, as a network of servers.

The host device 110 may send commands 115 to the data storage device 105. The commands 115 may be any number of commands 115 including, but not necessarily limited to, write commands, erase commands, and read commands. The data storage device 105 may include a controller 120 (such as a controller, a processing unit, an electrical circuit, an integrated circuit, instructions executed by a processor, and so on), a memory 135 (which may be a volatile memory such as dynamic random access memory (DRAM) or non-volatile memory such as magneto-resistive random access memory (MRAM)), and a rotational magnetic storage media 155 (such as a circular recording disk made from a magnetic material onto and/or into which data can be recorded as patterns of magnetic polarity, and so on). The controller 120 may receive and execute the commands 115. The controller 120 may transmit one or more responses 145 to the host device 110 (such as in response to receiving a command, as part of executing a received command, and so on).

As shown, the rotational magnetic storage media 155 include one or more tracks 165 that are divided into one or more sectors. As shown, the rotational magnetic storage media 155 and the tracks 165 may be angularly divided logically into one or more pseudo wedges 160 (that may be made up of one or more servo wedges). The controller 120 may be connected to a voice coil motor ("VCM") 150 that controls the location of a read head and a write head over a the rotational magnetic storage media 155 in order to retrieve data from the rotational magnetic storage media 155 and/or write data to the rotational magnetic storage media 155 in response to the commands 115.

The controller 120 may perform a method for using angular position tracking in mitigating data loss risks stemming from ATI, WATER, and/or other issues. The controller 120 may determine whether or not an angular position of a write operation overlaps a previously written area of one of the group of tracks based on the angular position of the write operation. If so, the controller 120 may increment a counter (such as for the group of tracks or another affected group of tracks) (which may be stored in the memory 135). If the counter exceeds a threshold (such as 50, 150, 300, and so on), an ATI or WATER (or other issue) mitigation procedure may be performed (such as on the group of tracks or another affected group of tracks).

Although the above describes the controller 120 as either incrementing the counter or not, it is understood that this is an example. The above may be handled differently in various implementations, such as to handle ATI, WATER, and/or other issues differently. For example, in some implementations the counter may be incremented by different amounts based on how close and/or far the write operation is from a previously written area. By way of another example, in some implementations a counter may only be updated if the angular position of a write operation is within a previously written area and the radial position of the write operation is within a threshold number of tracks (such as five) of the previously written area (and/or updated by different amounts depending on the number of tracks between the radial position of the write operation and the previously written area).

Figure 9:
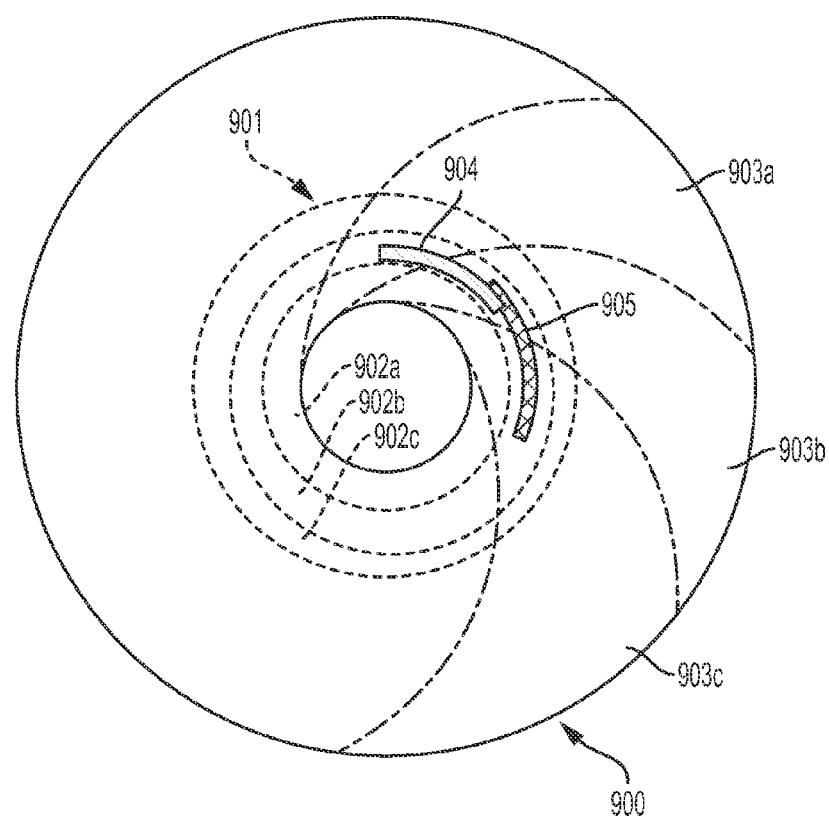
FIG. 9 is a diagram illustrating writes in different tracks that angularly overlap.

For purposes of clarity, FIG. 9 illustrates an example rotational magnetic storage media 900 that is divided into groups of tracks including a group of tracks 901 made up of tracks 902a-902c. As illustrated, the rotational magnetic storage media is also angularly divided logically into one or more pseudo wedges including pseudo wedges. FIG. 9 shows a first write 904 and a second write 905. Although the first write 904 and the second write 905 do not overlap radially within the track 902b, the first write 904 and the second write 905 angularly overlap as at least a portion of each is within the angular area defined as pseudo wedge 903b. In various implementations of the present disclosure, such an occurrence may result in the incrementing of one or more counters.

Figure 2A:
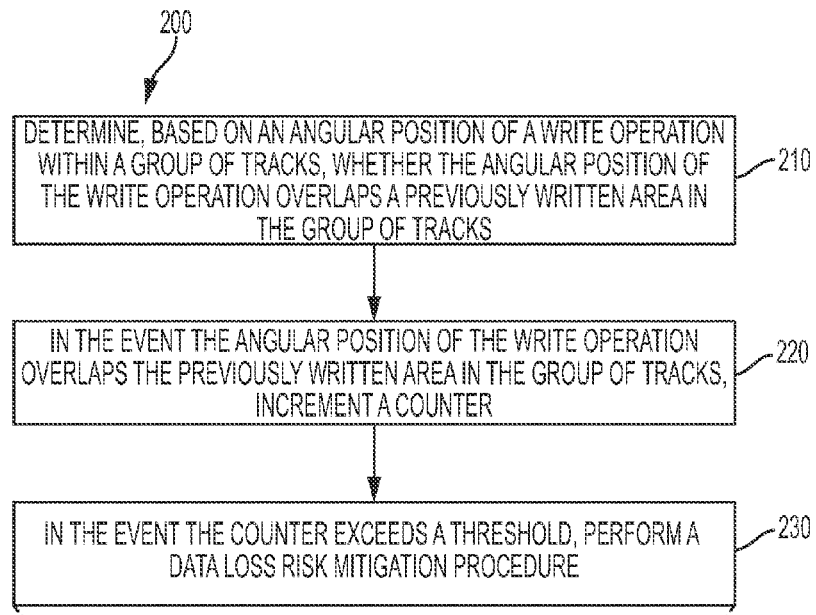
FIGS. 2A-2B is a flow chart and block diagram combination that depicts a flow chart of sample operations of a first example method of using angular position tracking in mitigating ATI, WATER, and/or other issues.
Figure 2B:
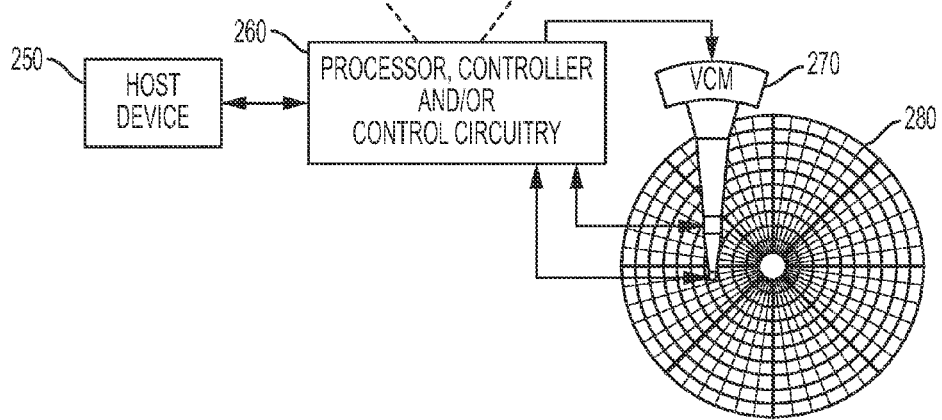

FIGS. 2A-2B is a flow chart and block diagram combination that depicts a flow chart of sample operations of a first example method 200 of using angular position tracking in mitigating data loss risks stemming from ATI, WATER, and/or other issues.

The method of FIG. 2A may begin at operation 210 where a determination is made whether or not an angular position of a write operation within a group of tracks (of groups into which a rotational magnetic storage disk is divided) overlaps a previously written area in the group of tracks. Next, at operation 220, a counter is incremented in the event the angular position overlaps the previously written area (such as a counter for the group of tracks and/or another affected group of tracks). Then, at operation 230, a data loss risk mitigation procedure is performed (such as on the group of tracks and/or another affected group of tracks).

Although the first example method 200 of FIG. 2A is illustrated and described as including particular operations performed in a particular order, it is understood that this is an example. In various implementations, various orders of the same, similar, and/or different operations may be performed without departing from the scope of the present disclosure. For example, although the method 200 discusses incrementing a counter if the angular position is determined to overlap a previously written area in the group of tracks, it is understood that this is an example. In various implementations, multiple groups of tracks may be affected by the angular position of the write and counters may be incremented for each of the affected multiple groups of tracks without departing from the scope of the present disclosure. In some cases, counters may be incremented differently for different affected groups of tracks, such as incrementing counters by a higher value for closer writes and a lower value for further writes. This may enable different handling of ATI, WATER, and/or other issues.

In many embodiments, the method of FIG. 2A can be implemented by a data storage device, such as depicted by the simplified block diagram of FIG. 2B. As shown, data storage device may include a processor, controller and/or control circuitry 260 that performs or coordinates one or more of the operations of the data storage device, such as performance of the method 200 of FIG. 2A. For example, the processor, controller and/or control circuitry 260 can be connected to a voice coil motor ("VCM") 270 that controls the location of a read head and a write head along a rotatable disk 280 (and/or other rotational magnetic storage medium) that is formed from a magnetic material. The processor, controller and/or control circuitry 260 may also communicate with one or more host devices 250 coupled to the data storage device.

Figure 3:
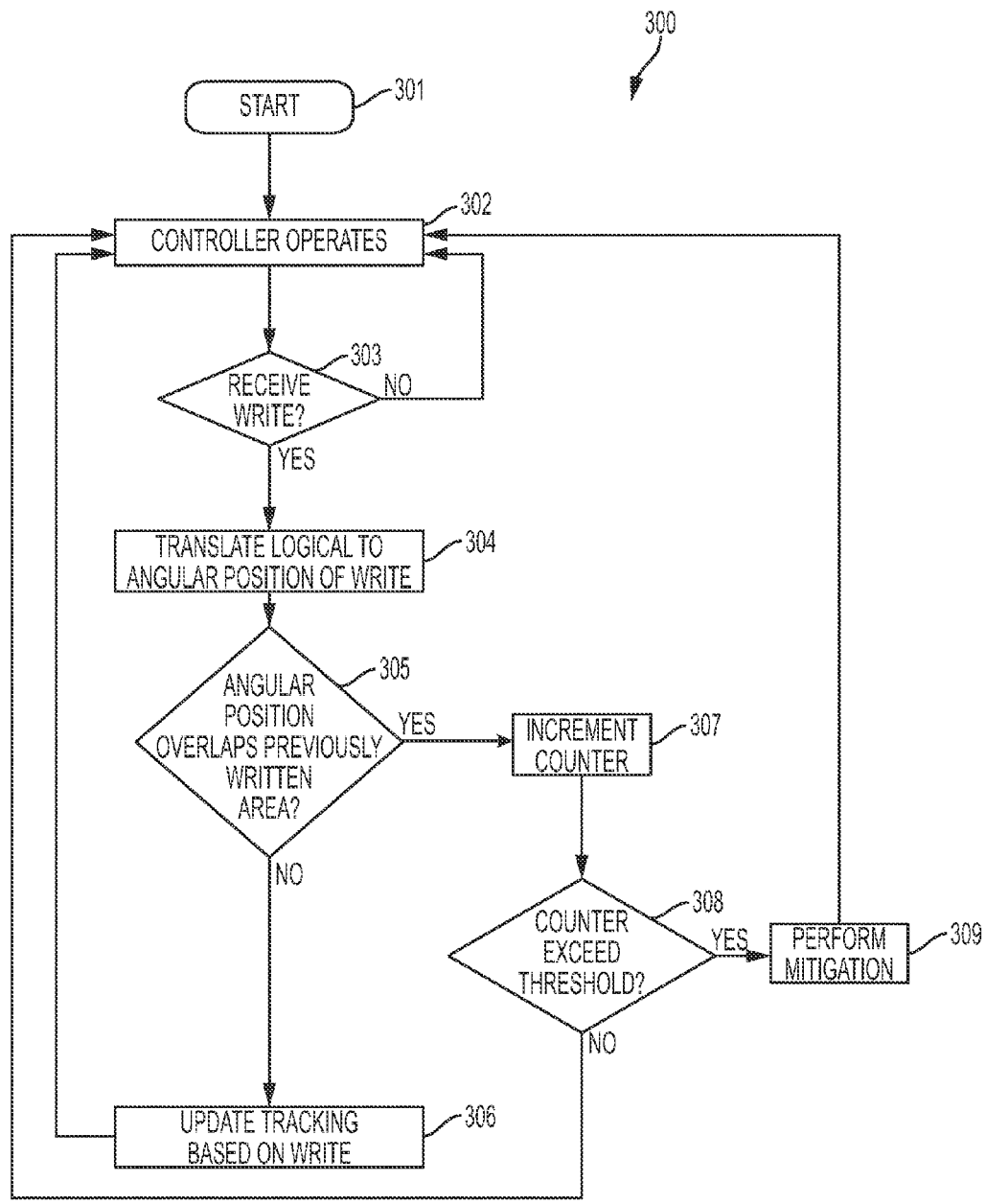
FIG. 3 depicts a flow chart of sample operations of a second example method of using angular position tracking in mitigating ATI, WATER, and/or other issues. This second example method may be performed by the data storage device of FIG. 1 and/or the processor, controller and/or control circuitry of FIG. 2B.

FIG. 3 depicts a flow chart of sample operations of a second example method 300 of using angular position tracking in mitigating data loss risks stemming from ATI, WATER, and/or other issues. This second example method 300 may be performed by the data storage device 105 of FIG. 1 and/or the processor, controller and/or control circuitry 260 of FIG. 2B.

The flow may begin block 301 and proceed to block 302 where a controller operates. Next, the flow may proceed to block 303 where the controller may determine whether or not a write operation within a group of tracks has been received for a rotational magnetic storage media that is divided into groups of tracks. If not, the flow may return to block 302 where the controller continues to operate. Otherwise, the flow may proceed to block 304.

At block 304, after the controller determines that a write has been received, the controller may translate the logical address of the write to the angular position of the write. This may be performed utilizing logical to physical address translation. The flow may then proceed to block 305.

At block 305, the controller may determine whether or not the angular position of the write overlaps a previously written area in the group of tracks. If so, the flow may proceed to block 307 where the controller increments a counter for the group of tracks before the flow proceeds to block 308. Otherwise, the flow may proceed to block 306 where the controller updates tracking of previously written areas based on the write before the flow returns to block 302.

At block 308, the controller may determine whether or not the counter exceeds a threshold. If not, the flow may return to block 302 where the controller continues to operate. Otherwise, the flow may proceed to block 309 where the controller performs a data loss risk mitigation procedure on the group of tracks, to counter increased risks due to ATI, WATER, and/or other issues, before the flow returns to block 302 where the controller continues to operate.

Although the example method 300 is illustrated and described as including particular operations performed in a particular order, it is understood that this is an example. In various implementations, various orders of the same, similar, and/or different operations may be performed without departing from the scope of the present disclosure.

For example, although the method 300 discusses incrementing a counter for a group of tracks if the angular position is determined to overlap a previously written area in that group of tracks, it is understood that in various implementations multiple groups of tracks may be affected and counters may be incremented for each of the affected multiple groups of tracks. By way of another example, although performance of a mitigation procedure is discussed as being triggered by a single counter exceeding a threshold, it is understood that in some implementations separate ATI, WATER, and/or other issue counters may be incremented based on the angular position of a write and mitigation procedures may be triggered by any one of such counters exceeding a threshold, or comparisons of a combination of counters and/or thresholds.

Figure 4:
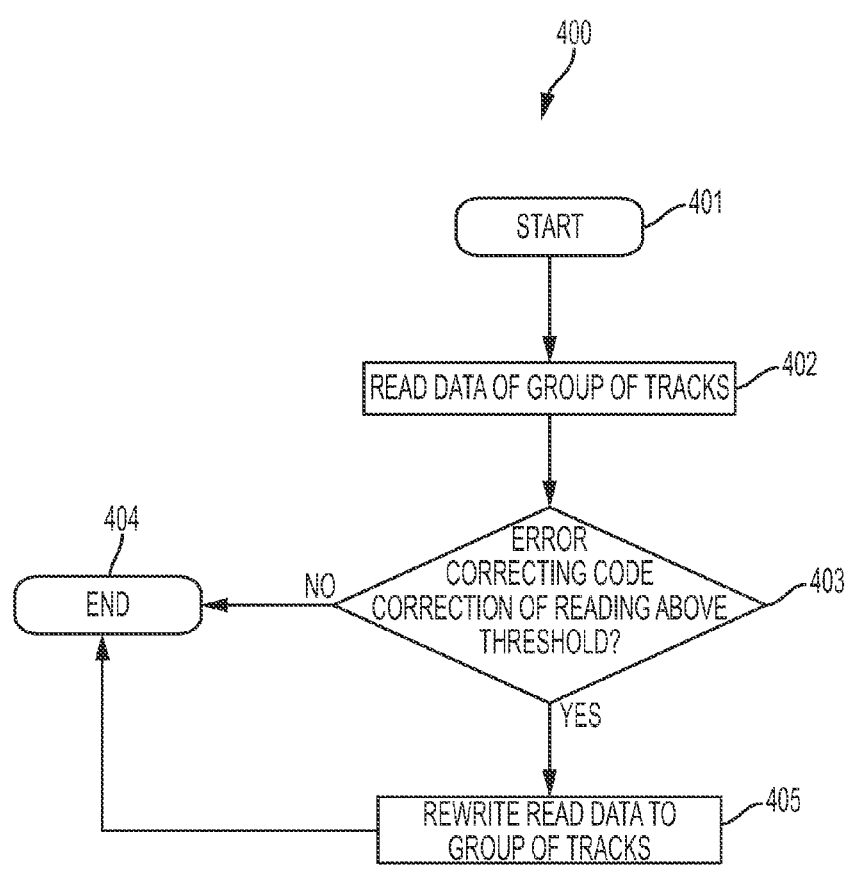
FIG. 4 depicts a flow chart of sample operations of an example method of mitigating ATI, WATER, and/or other issues. This example method may be performed by the data storage device of FIG. 1 and/or the processor, controller and/or control circuitry of FIG. 2B.

FIG. 4 depicts a flow chart of sample operations of an example method 400 of mitigating ATI, WATER, and/or other issues. This example method 400 may be performed by the data storage device 105 of FIG. 1 and/or the processor, controller and/or control circuitry 260 of FIG. 2B.

The flow may begin block 401 and proceed to block 402 where a controller may read the data of a group of tracks. The flow may then proceed to block 403 where the controller determines whether or not an error correcting code correction of the read data is above a threshold. For example, if the controller used an error correcting code to correct more than 5% of the read data, the controller may determine that the error correcting code correction is above the threshold.

If the controller determines the error correcting code correction of the read data is above the threshold, the flow may proceed to block 405 where the controller rewrites the read data back to the group of tracks. Rewriting of the read data may mitigate integrity issues in the group of tracks caused by ATI, WATER, and/or other issues. Otherwise, if the flow may proceed to block 404 and end.

Although the example method 400 is illustrated and described as including particular operations performed in a particular order, it is understood that this is an example. In various implementations, various orders of the same, similar, and/or different operations may be performed without departing from the scope of the present disclosure.

For example, block 403 is illustrated and described as rewriting the read data if an error correcting code correction of the read data is above a threshold. However, in other implementations the controller may rewrite the read data to the group of tracks without making any kind of determination. In still other implementations, the controller may determine whether or not to rewrite the read data based on determinations other than an error correcting code correction. For example, the controller may determine to rewrite the read data based on various out of band information such signal amplitude of the read, signal shapes of the read, and/or any other information indicating that the integrity of the magnetic patterns of the group of tracks has been impaired by ATI, WATER, and/or other issues.

Returning to FIG. 1, the controller 120 may compare the angular position of the write operation to one or more pointers or bit masks indicating an angular area of the group of tracks where write operations have been performed subsequent to the last time that the counter was incremented. The resolution of such pointers or bit masks may correspond to space available in the memory 135 for tracking previously written areas while the storage device 105 is in operation.

For example, 16 bits of the memory 135 (e.g., DRAM) may be available per group of tracks for tracking previously written areas while the storage device 105 is in operation. The resolution of any pointers or bit masks per group of tracks may thus correspond to the information that can be tracked with 16 bits. In one example, this could result in approximately 1.7 megabytes of the memory 135 out of a possible 128 megabytes dedicated to tracking previous writes with groups of tracks of four tracks each for a data storage device with a capacity of six terabytes.

In one case of such an example, the 16 bits may be used to implement an 8-bit maximum previously written pointer and an 8-bit minimum previously written pointer that indicate an upper boundary and a lower boundary of previous angular write locations corresponding to the highest and lowest servo wedges logically dividing a group of tracks, resulting in a resolution of 256 servo wedges per group of tracks.

However, in another case of such an example, the group of tracks may be split into 4 angular sections that each have a 2-bit maximum previously written pointer and a 2-bit minimum previously written pointer. This would result in a resolution of 16 servo wedges per group of tracks, but allow for greater granularity in tracking previously written areas thus reducing the possibility of triggering mitigation procedures when not useful.

In still another case of such an example, a single 16-bit maximum or previously written pointer may be utilized, referenced from a zero index of the group of adjacent pseudo wedges logically dividing a group of tracks. This may reduce the granularity of tracking previously written areas, but may increase the number of servo wedges that can be tracked per group of tracks.

In yet another case of such an example, the 16 bits may be used to implement a bit mask of 16 bits. Higher resolution bit masks (such as a bit mask of 32 bits) may allow for allow for greater granularity in tracking previously written areas, but may require more processing time to search, update, and/or otherwise administer.

Although the above describes 16 bits of the memory 135 available per group of tracks for tracking previously written areas while the storage device 105 is in operation, it is understood that this is an example and is not intended to be limiting. Any amount of the memory 135 may be available per group of tracks for tracking previously written areas while the storage device 105 is in operation in various implementations, such as 32 bits.

Although the above discusses the group of tracks logically divided by adjacent servo wedges, it is understood that these are examples for the purposes of clarity. In some cases, the memory 135 available per group of tracks for tracking previously written areas while the storage device 105 is in operation may not be sufficiently large to allow tracking of individual adjacent servo wedges. In such cases, groups of adjacent servo wedges may be pseudo servo wedges that are actually each made up of groups of adjacent actual servo wedges. The number of servo wedges or pseudo servo wedges that logically divide a group of tracks may correspond to the memory 135 available per group of tracks for tracking previously written areas while the storage device 105 is in operation.

Figure 5:
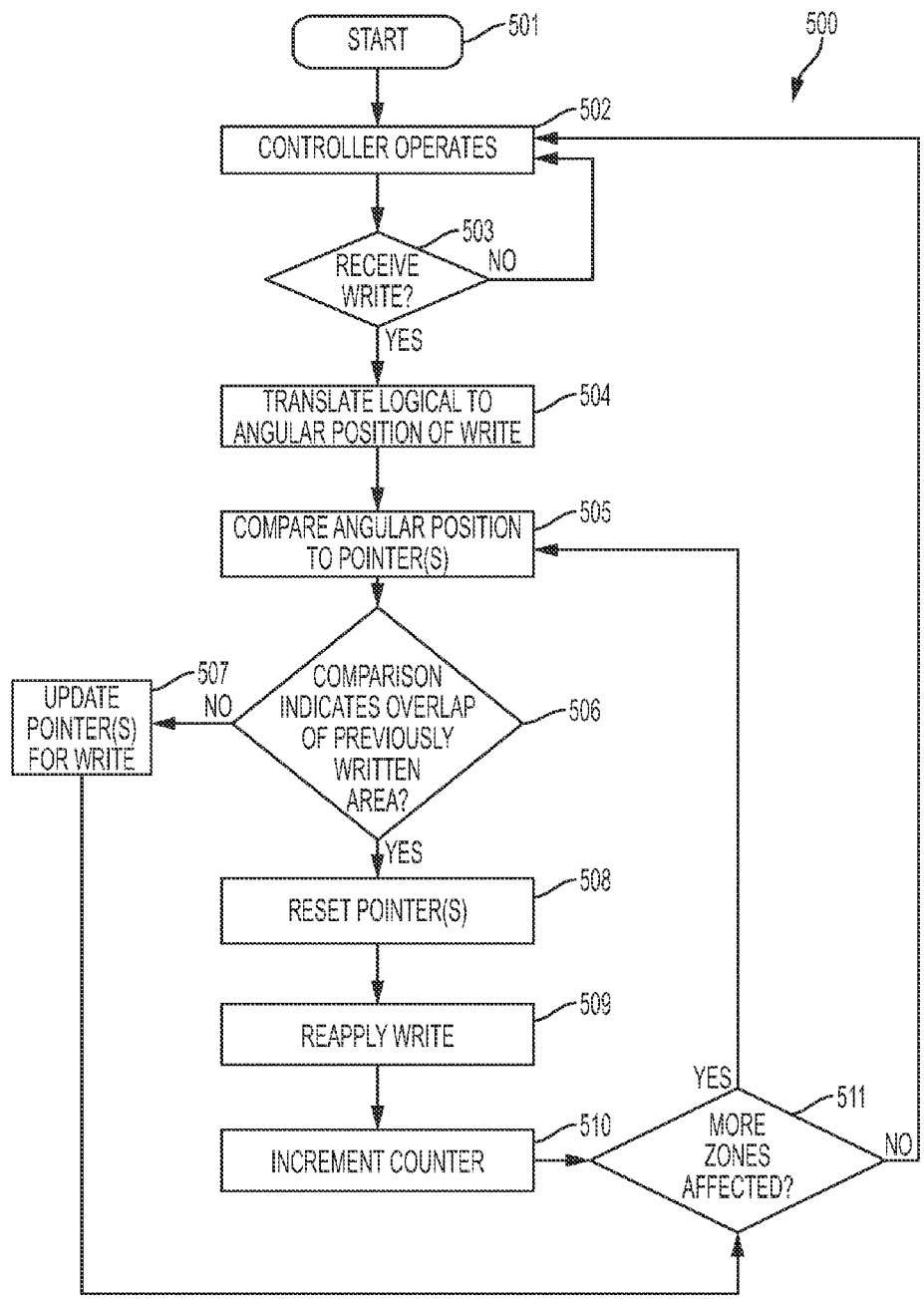
FIG. 5 depicts a flow chart of sample operations of a third example method of using angular position tracking in mitigating ATI, WATER, and/or other issues. This third example method may be performed by the data storage device of FIG. 1 and/or the processor, controller and/or control circuitry of FIG. 2B.

FIG. 5 depicts a flow chart of sample operations of a third example method 500 of using angular position tracking in mitigating data loss risks stemming from ATI, WATER, and/or other issues. This third example method 500 may be performed by the data storage device 105 of FIG. 1 and/or the processor, controller and/or control circuitry 260 of FIG. 2B.

The flow may begin block 501 and proceed to block 502 where a controller operates. Next, the flow may proceed to block 503 where the controller may determine whether or not a write operation within a group of tracks has been received for a rotational magnetic storage media that is divided into groups of tracks. If not, the flow may return to block 502 where the controller continues to operate. Otherwise, the flow may proceed to block 504.

At block 504, after the controller determines that a write has been received, the controller may translate the logical address of the write to the angular position of the write. This may be performed utilizing logical to physical address translation (i.e., the angular position may be obtained by performing logical to physical address translation). The flow may then proceed to block 505.

At block 505, the controller may compare the angular position of the write to one or more pointers indicating an area of the group of tracks where a write has been performed previous to incrementing of a counter. The flow may then proceed to block 506 where the controller determines whether or not the comparison indicates that the angular position of the write overlaps a previously written area. If so, the flow may proceed to block 508. Otherwise, the flow may proceed to block 507.

At block 508, if the comparison of the angular position of the write to the one or more pointers indicates that the angular position of the write overlaps a previously written area, the controller may reset the one or more pointers. For example, if maximum and minimum pointers are used that indicate the highest and lowest servo wedges of a group of servo wedges logically dividing the group of tracks that have been previously written to, the maximum pointer may be set to a zero index for the group of servo wedges and the minimum pointer may then be set to the maximum pointer. The flow may then proceed to block 509 where the controller reapplies the write before the flow proceeds to block 510 where the controller increments a counter for the group of tracks.

Although blocks 508-509 are illustrated and described as resetting one or more pointers and reapplying the write, it is understood that this is an example and that the function is to update the one or more pointers for the write. In various implementations, the one or more pointers may be updated for the write by other procedures other than resetting the one or more pointers and reapplying the write.

After the controller increments the counter for the group of tracks, the flow may proceed to block 511 where the controller determines whether or not any other additional groups of tracks may be affected by the write. If so, the flow returns to block 505 where the controller compares the angular position of the write to an additional group of tracks. Otherwise, the flow returns to block 502 where the controller continues to operate.

At block 507, if the comparison of the angular position of the write to the one or more pointers indicates that the angular position of the write is does not overlap a previously written area, the flow may proceed to block 511 where the controller determines whether or not any other additional groups of tracks may be affected by the write.

Although blocks 505-511 are illustrated and described as incrementing a counter for a group of tracks and then determining whether or not to evaluate any additional groups of tracks, it is understood that this is an example simplified for clarity. At any time after a counter is incremented for a group of tracks, the controller may determine whether or not that counter exceeds a threshold. If so, the controller may perform a mitigation procedure on the respective group of tracks. This may be performed while one or more other groups of tracks are being evaluated.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as comparing the angular position to a single set of one or more pointers for a group of tracks. However, in various implementations the angular position may be compared to multiple sets of one or more pointers that are each respectively associated with ATI, WATER, or other issues. As such, counters associated with ATI, WATER, or other issues may be respectively incremented based on such comparisons such that controller may separately trigger mitigation procedures separately for ATI, WATER, or other issues, or these issues may be considered in combination in determining whether mitigation procedures are triggered.

Figure 6:
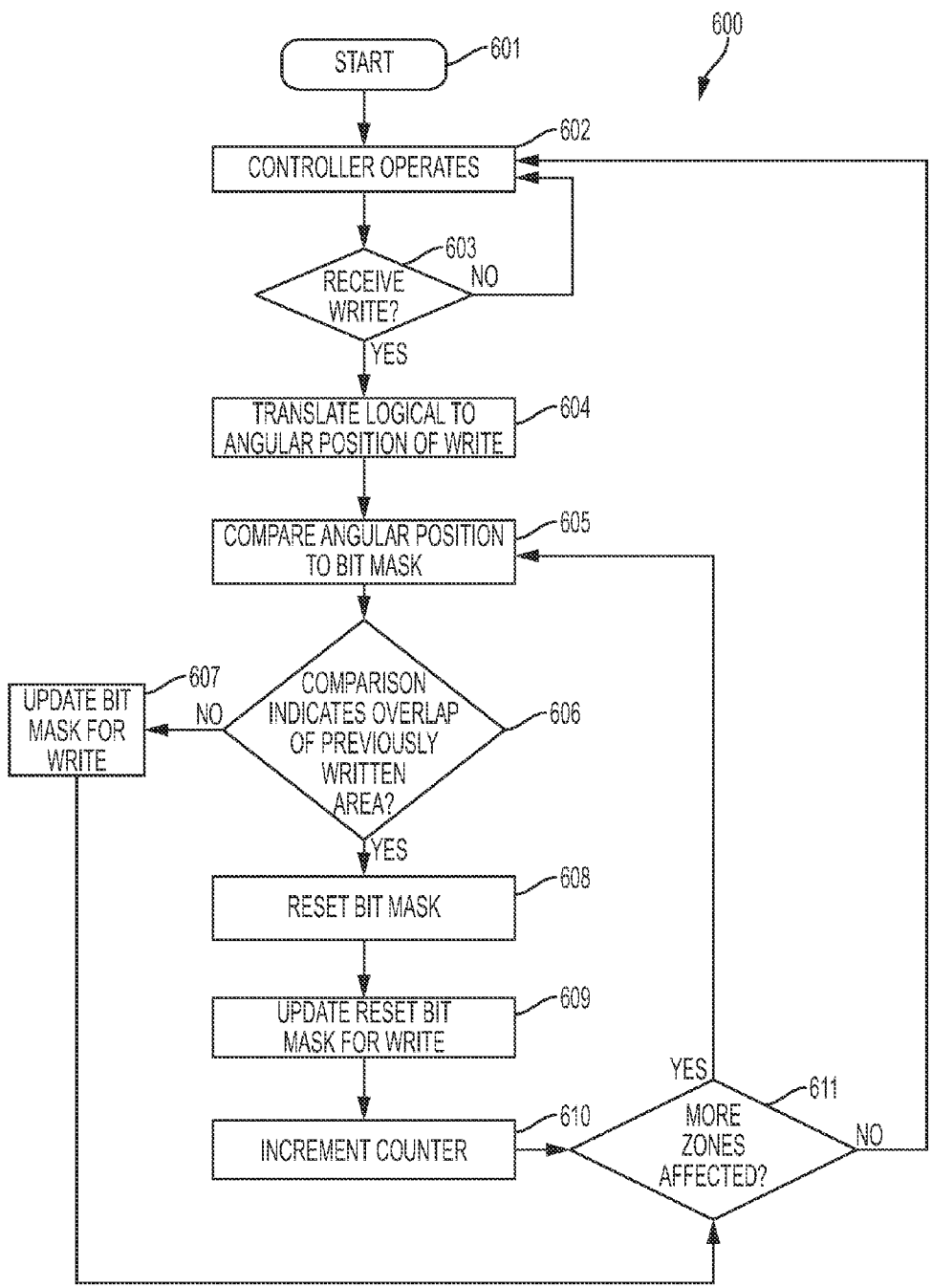
FIG. 6 depicts a flow chart of sample operations of a fourth example method of using angular position tracking in mitigating ATI, WATER, and/or other issues. This fourth example method may be performed by the data storage device of FIG. 1 and/or the processor, controller and/or control circuitry of FIG. 2B.

FIG. 6 depicts a flow chart of sample operations of a fourth example method 600 of using angular position tracking in mitigating data loss risks stemming from ATI, WATER, and/or other issues. This fourth example method 600 may be performed by the data storage device 105 of FIG. 1 and/or the processor, controller and/or control circuitry 260 of FIG. 2B.

The flow may begin block 601 and proceed to block 602 where a controller operates. Next, the flow may proceed to block 603 where the controller may determine whether or not a write operation within a group of tracks has been received for a rotational magnetic storage media that is divided into groups of tracks. If not, the flow may return to block 602 where the controller continues to operate. Otherwise, the flow may proceed to block 604.

At block 604, after the controller determines that a write has been received, the controller may translate the logical address of the write to the angular position of the write. This may be performed utilizing logical to physical address translation (i.e., the angular position may be obtained by performing logical to physical address translation). The flow may then proceed to block 605.

At block 605, the controller may compare the angular position of the write to a bit mask indicating an area of the group of tracks where a write has been performed previous to incrementing of a counter. Such a bit mask may include a location storing information corresponding to the angular position and may indicate all areas of the group of tracks where writes have been performed subsequent to incrementing the counter. The flow may then proceed to block 606 where the controller determines whether or not the comparison indicates that the angular position of the write overlaps a previously written area. If so, the flow may proceed to block 608. Otherwise, the flow may proceed to block 607.

At block 608, if the comparison of the angular position of the write to the bit mask indicates that the angular position of the write overlaps one of the previously written areas, the controller may reset the bit mask. The flow may then proceed to block 609 where the controller updates the reset bit mask for the write before the flow proceeds to block 610 where the controller increments a counter for the group of tracks.

After the controller increments the counter for the group of tracks, the flow may proceed to block 611 where the controller determines whether or not any other additional groups of tracks may be affected by the write. If so, the flow returns to block 605 where the controller compares the angular position of the write to an additional group of tracks. Otherwise, the flow returns to block 602 where the controller continues to operate.

At block 607, if the comparison of the angular position of the write to the bit mask indicates that the angular position of the write does not overlap a previously written area (i.e., is outside one of the previously written areas), the flow may proceed to block 611 where the controller determines whether or not any other additional group of tracks may be affected by the write.

Although blocks 605-611 are illustrated and described as incrementing a counter for a group of tracks and then determining whether or not to evaluate any additional groups of tracks, it is understood that this is an example simplified for clarity. At any time after a counter is incremented for a group of tracks, the controller may determine whether or not that counter exceeds a threshold. If so, the controller may perform a mitigation procedure on the respective group of tracks. This may be performed while one or more other groups of tracks are being evaluated.

Although the example method 600 is illustrated and described as including particular operations performed in a particular order, it is understood that this is an example. In various implementations, various orders of the same, similar, and/or different operations may be performed without departing from the scope of the present disclosure. For example, the method 600 is illustrated and described as comparing the angular position to a single bit mask for a group of tracks. However, in various implementations the angular position may be compared to multiple bit masks that are each respectively associated with ATI, WATER, or other issues. As such, counters associated with ATI, WATER, or other issues may be respectively incremented based on such comparisons such that controller may separately trigger mitigation procedures separately for ATI, WATER, or other issues, or these issues may be considered in combination in determining whether mitigation procedures are triggered.

FIGS. 7A-7E are diagrams illustrating a rotational magnetic storage medium during performance of a method of using angular position tracking in mitigating data loss risks stemming from ATI, WATER, and/or other issues utilizing one or more pointers 701 and 702. The method may be the method illustrated in FIG. 5.

Figure 7A:
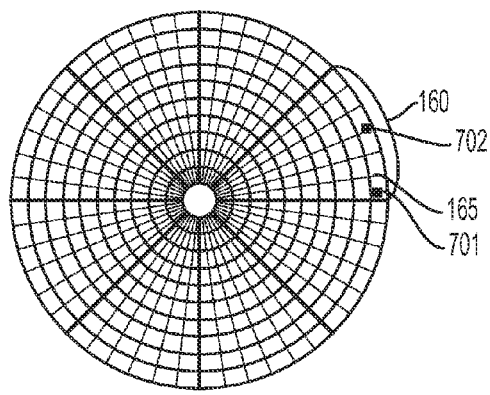
FIGS. 7A-7E are diagrams illustrating a rotational magnetic storage medium during performance of a method of using angular position tracking in mitigating ATI, WATER, and/or other issues utilizing one or more pointers. The method may be the method illustrated in FIG. 5.

FIG. 7A illustrates a minimum previous write location pointer 701 that represents the lowest written servo wedge of a group of adjacent servo wedges 160 angularly logically dividing a group of tracks 165. FIG. 7A also illustrates a maximum previous write location pointer 702 that represents the highest written servo wedge of the group of adjacent servo wedges 160 logically dividing the group of tracks 165. Thus, the minimum previous write location pointer 701 and the maximum previous write location pointer 702 represent upper and lower angular boundaries of the group of tracks 165 that have been written.

Figure 7B:
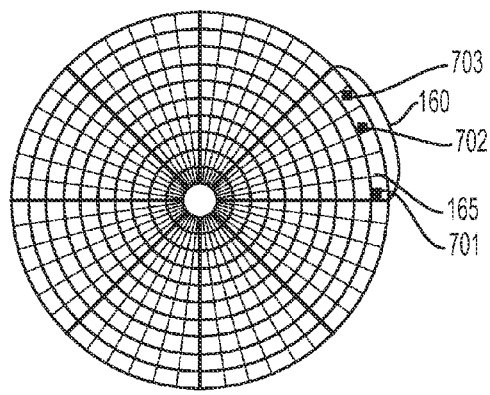
Figure 7C:
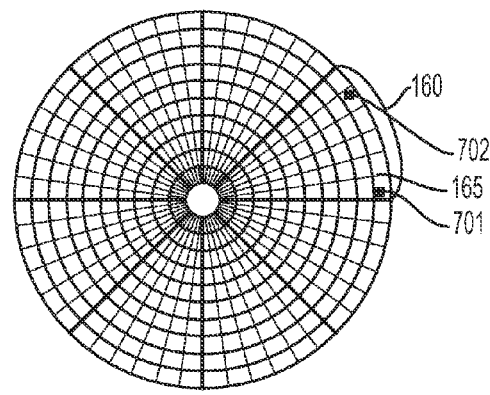

FIG. 7B illustrates the angular position of a write 703. As shown, the angular position of the write 703 is not between the minimum previous write location pointer 701 and the maximum previous write location pointer 702. To the contrary, as shown, the angular position of the write 703 is above the maximum previous write location pointer 702. Thus, the write 703 does not overlap a previously written area of the group of tracks 165. As such, a counter for the group of tracks 165 is not incremented and the maximum previous write location pointer 702 is updated for the write 703, as shown in FIG. 7C.

Figure 7D:
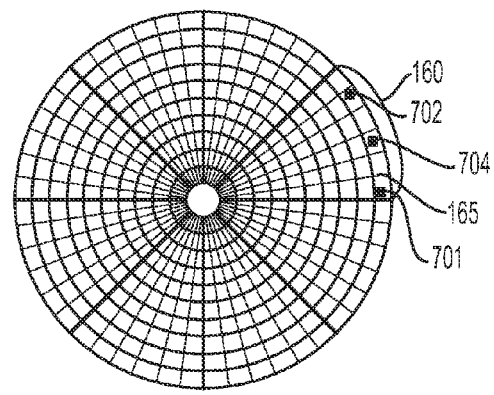
Figure 7E:
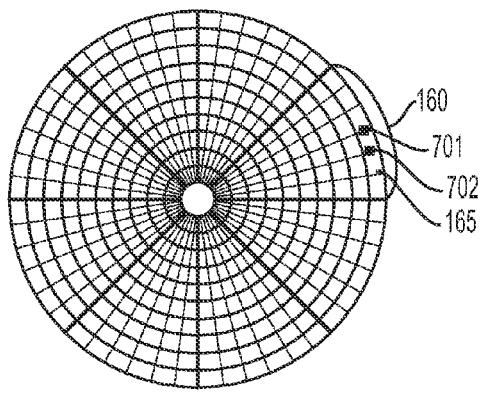

FIG. 7D illustrates the angular position of a write 704. As shown, the angular position of the write 704 is between the minimum previous write location pointer 701 and the maximum previous write location pointer 702. Thus, the write 704 overlaps a previously written area of the group of tracks 165. As such, a counter for the group of tracks 165 is incremented. Further, the minimum previous write location pointer 701 and the maximum previous write location pointer 702 are updated for the write 704 (shown spaced by the resolution of the write 704), as shown in FIG. 7E.

Figure 8A:
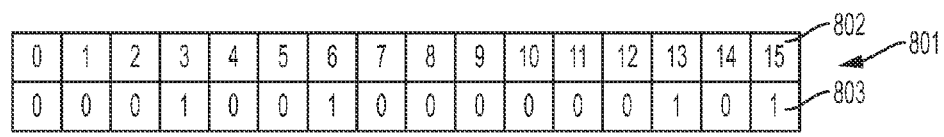
FIGS. 8A-8C are diagrams illustrating a bit mask during performance of a method of using angular position tracking in mitigating ATI, WATER, and/or other issues utilizing the bit mask. The method may be the method illustrated in FIG. 6.
Figure 8B:
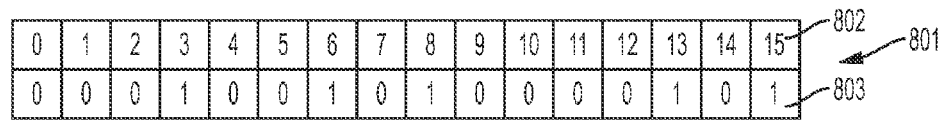
Figure 8C:
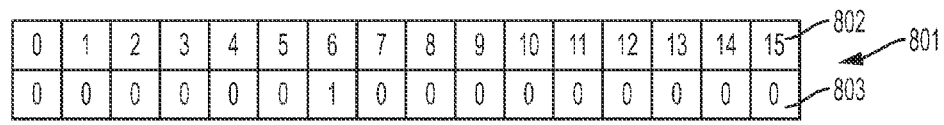

FIGS. 8A-8C are diagrams illustrating a bit mask during performance of a method of using angular position tracking in mitigating data loss risks stemming from ATI, WATER, and/or other issues utilizing the bit mask 801. The method may be the method illustrated in FIG. 6.

As illustrated in FIG. 8A, the bit mask 801 includes a series of indexes 802 and a series of values 803 corresponding to a group of adjacent servo wedges that angularly logically divide a group of tracks. The values 803 indicate whether or not a write has been performed to the group of tracks with an angular position corresponding to a servo wedge of the group of adjacent servo wedges that is indicated by a particular index 802. In this example, a value 803 of "1" indicates that a write has been performed and a "0" indicates that a write has not been performed. As shown, the indexes 802 of "3," "6," "13," and "15" have values 803 of "1," indicating that the group of tracks have previously been written to at angular positions corresponding to associated servo wedges.

FIG. 8B illustrates the bit mask 801 after a write to the group of tracks with an angular position corresponding to servo wedge associated with the index 802 "8." FIG. 8A previously illustrated the index 802 "8" with a value 803 of "0," indicating that the group of tracks had not been written to at an angular position corresponding to associated servo wedge. Thus, when the angular position of the write was compared to the bit mask 801, it was determined that the write did not overlap a previously written area of the group of tracks. Thus, a counter associated with the group of tracks was not incremented and, as shown in FIG. 8B, the bit mask 801 was updated such that the index 802 "8" has a value 803 of "1."

FIG. 8C illustrates the bit mask 801 after a write to the group of tracks at an angular position corresponding to the servo wedge associated with the index 802 "6." FIG. 8B previously illustrated the index 802 "6" with a value 803 of "1," indicating that the group of tracks had been written to at an angular position corresponding to the associated servo wedge. Thus, when the angular position of the write was compared to the bit mask 801, it was determined that the write overlapped a previously written area of the group of tracks. Thus, a counter associated with the group of tracks was incremented, and, as shown in FIG. 8C, the bit mask 801 was reset and then updated for the write such that the index 802 "6" has a value 803 of "1" but the values 803 of all other indexes 802 are "0."

As described above and illustrated in the accompanying figures, some embodiments described herein relate to systems, apparatuses, and methods related to using angular position tracking in mitigating data loss risks stemming from ATI, WATER, and/or other issues. Whether or not an angular position of a write operation overlaps a previously written area of a group of tracks of groups of tracks into which a rotational magnetic storage medium is divided may be determined based on the angular position of the write operation. In the event that the angular position of the write operation overlaps the previously written area, a counter may be incremented. If the counter exceeds a threshold, a data loss risk mitigation procedure may be performed. In this way, performance of the mitigation procedure more often than is useful may be avoided, improving performance of a data storage device including the rotational magnetic storage medium.

In various embodiments, a storage device includes a rotational magnetic storage medium divided into groups of tracks and a controller, communicably coupled to the rotational magnetic storage medium. The controller may be configured to: determine, based on an angular position of a write operation within a group of tracks, whether the angular position of the write operation overlaps a previously written area in the group of tracks; in the event the angular position of the write operation overlaps the previously written area, increment a counter; and in the event the counter exceeds a counter threshold, perform a data loss risk mitigation procedure.

In one or more embodiments, a method for determining when to perform an adjacent track interference or wide area track erasure mitigation procedure includes: comparing an angular position of a current write to at least one pointer indicating an area of a group of tracks of a rotational magnetic storage medium where at least one write has been performed subsequent to incrementing a counter; in the event the comparison indicates the angular position overlaps the area, incrementing the counter; and in the event the counter exceeds a threshold, performing a data loss risk mitigation procedure.

In some embodiments, a method for determining when to perform an adjacent track interference or wide area track erasure mitigation procedure includes: comparing an angular position of a current write to a bit mask including data indicating areas of a group of tracks of a rotational magnetic storage medium where writes have been performed subsequent to incrementing a counter; in the event the bit mask indicates the angular position overlaps the areas, incrementing the counter; and in the event the counter exceeds a threshold, performing a data loss risk mitigation procedure.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order, or fewer or additional steps may be required or desired for particular embodiments.

We claim:

1. A storage device, comprising:
a rotational magnetic storage medium divided into groups of tracks; and
a controller, communicably coupled to the rotational magnetic storage medium, the controller being configured to:
determine, based on an angular position of a write operation within a group of tracks, whether the angular position of the write operation overlaps a previously written area in the group of tracks;
in the event the angular position of the write operation overlaps the previously written area in the group of tracks, increment a counter; and
in the event the counter exceeds a counter threshold, perform a data loss risk mitigation procedure.

2. The storage device of claim 1, wherein:
the controller is further configured to determine whether the angular position of the write operation overlaps the previously written area in the group of tracks by determining whether the angular position of the write operation is below a maximum previous write location pointer for the group of tracks; and
the maximum previous write location pointer indicates a highest written servo wedge of a group of adjacent servo wedges.

3. The storage device of claim 2, wherein a resolution of the maximum previous write location pointer corresponds to space available in volatile memory of the storage device while the storage device is in operation.

4. The storage device of claim 1, wherein:
the controller is further configured to determine whether the angular position of the write operation overlaps the previously written area in the group of tracks by determining whether the angular position of the write operation is between a minimum previous write location pointer and a maximum previous write location pointer for the group of tracks; and
the maximum and minimum previous write location pointers indicate an area of previous write angular positions in a group of adjacent servo wedges.

5. The storage device of claim 1, wherein the controller is further configured to determine whether the angular position of the write operation overlaps the previously written area in the group of tracks by comparing the angular position of the write operation to a bit mask that represents indications of previous write angular positions in a group of adjacent servo wedges.

6. The storage device of claim 5, wherein a resolution of the bit mask corresponds to space available in volatile memory of the storage device while the storage device is in operation.

7. The storage device of claim 1, wherein the controller is further configured to determine the angular position of the write operation by performing a logical to physical address translation.

8. The storage device of claim 1, wherein:
the controller is further configured to determine whether the angular position of the write operation overlaps the previously written area in the group of tracks by determining whether the angular position of the write operation is above a minimum previous write location pointer for the group of tracks; and
the minimum previous write location pointer indicates a lowest written servo wedge of a group of adjacent servo wedges.

9. The storage device of claim 1, wherein the data loss risk mitigation procedure comprises:
reading data of the group of tracks; and
in the event that an error correcting code correction of the reading is above an error correction threshold, rewriting the read data to the group of tracks.

10. A method for determining when to perform a data loss risk mitigation procedure, the method comprising:
comparing, utilizing an electronic device, an angular position of a current write to at least one pointer indicating an area of a group of tracks of a rotational magnetic storage medium where at least one write has been performed subsequent to incrementing a counter;
in the event the comparison indicates the angular position overlaps the area, incrementing the counter utilizing the electronic device; and
in the event the counter exceeds a threshold, performing a data loss risk mitigation procedure utilizing the electronic device.

11. The method of claim 10, further comprising:
in the event the comparison indicates the angular position does not overlap the area, updating the at least one pointer in accordance with the current write.

12. The method of claim 10, wherein the at least one pointer comprises a first pointer representing a lower boundary of previous write angular positions in a group of adjacent servo wedges and a second pointer representing an upper boundary of the previous write angular positions in the group of adjacent servo wedges.

13. The method of claim 12, further comprising:
in the event the comparison indicates the angular position overlaps the area, resetting the first pointer and the second pointer to indicate the current write.

14. The method of claim 10, wherein said operation of comparing the angular position of the current write to the at least one pointer further comprises determining whether the angular position is between a maximum previous write location pointer indicating a highest written servo wedge of a group of adjacent servo wedges and a zero index for the group of adjacent servo wedges.

15. The method of claim 10, wherein a resolution of the at least one pointer corresponds to space available in volatile memory for tracking performed writes during operation of the rotational magnetic storage medium.

16. The method of claim 10, further comprising performing logical to physical address translation to obtain the angular position.

17. The method of claim 10, wherein the data loss risk mitigation procedure comprises:
reading data of the group of tracks; and
in the event that an error correcting code correction of the reading is above an error correction threshold, rewriting the read data to the group of tracks.

18. A method for determining when to perform a data loss risk mitigation procedure, the method comprising:
comparing, utilizing an electronic device, an angular position of a current write to a bit mask including data indicating areas of a group of tracks of a rotational magnetic storage medium where writes have been performed subsequent to incrementing a counter;
in the event the bit mask indicates the angular position overlaps the areas, incrementing the counter utilizing the electronic device; and
in the event the counter exceeds a threshold, performing a data loss risk mitigation procedure utilizing the electronic device.

19. The method of claim 18, wherein the bit mask includes a location storing information corresponding to the angular position.

20. The method of claim 18, wherein the data included in the bit mask indicates all areas of the group of tracks where writes have been performed subsequent to incrementing the counter.

21. The method of claim 18, further comprising at least one of:
in the event the bit mask indicates the angular position does not overlap the areas, updating the bit mask in accordance with the current write; or
in the event the bit mask indicates the angular position overlaps the areas, resetting the data of the bit mask and updating the bit mask in accordance with the current write.

22. The method of claim 18, wherein the data indicates previous write angular positions in a group of adjacent servo wedges.

23. The method of claim 18, wherein a resolution of the bit mask corresponds to space available in volatile memory for tracking performed writes during operation of the rotational magnetic storage medium.

24. The method of claim 18, further comprising:
comparing the angular position to an additional bit mask indicating areas of an additional group of tracks where writes have been performed subsequent to incrementing an additional counter;
in the event the additional bit mask indicates the angular position overlaps the areas of the additional group of tracks, incrementing the additional counter; and
in the event the additional counter exceeds the threshold, performing the data loss risk mitigation procedure.

25. The method of claim 18, wherein the bit mask is associated with adjacent track interference in the group of tracks, further comprising:
comparing the angular position to an additional bit mask associated with wide area track erasure in the group of tracks;
in the event the additional bit mask indicates the angular position overlaps a previously written area, incrementing an additional counter; and
in the event the additional counter exceeds the threshold, performing the data loss risk mitigation procedure.

26. The method of claim 18, wherein the data loss risk mitigation procedure comprises:
reading data of the group of tracks; and
in the event that an error correcting code correction of the reading is above an error correction threshold, rewriting the read data to the group of tracks.

* * * * *